US012578764B2

(12) United States Patent
Hsieh et al.

(10) Patent No.: US 12,578,764 B2
(45) Date of Patent: Mar. 17, 2026

(54) ROLLABLE DISPLAY DEVICES WITH MOVABLE HINGE

(71) Applicant: Hewlett-Packard Development Company, L.P., Spring, TX (US)

(72) Inventors: Hsing-Hung Hsieh, Taipei City (TW); Han Chi Tsai, Taipei City (TW); Yung Yun Chen, Taipei City (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 116 days.

(21) Appl. No.: 18/558,633

(22) PCT Filed: May 24, 2021

(86) PCT No.: PCT/US2021/033840
§ 371 (c)(1),
(2) Date: Nov. 2, 2023

(87) PCT Pub. No.: WO2022/250645
PCT Pub. Date: Dec. 1, 2022

(65) Prior Publication Data
US 2024/0241546 A1     Jul. 18, 2024

(51) Int. Cl.
*G06F 1/16*          (2006.01)

(52) U.S. Cl.
CPC .......... *G06F 1/1652* (2013.01); *G06F 1/1616* (2013.01); *G06F 1/1624* (2013.01); *G06F 1/1654* (2013.01); *G06F 1/1681* (2013.01)

(58) Field of Classification Search
CPC .... G06F 1/1652; G06F 1/1624; G06F 1/1681; G06F 1/1616
See application file for complete search history.

(56) References Cited

U.S. PATENT DOCUMENTS

| | | | |
|---|---|---|---|
| 8,787,008 B2 * | 7/2014 | Walters ................. | G06F 1/1624 |
| | | | 361/679.04 |
| 10,401,925 B2 | 9/2019 | Uchino et al. | |
| 10,817,022 B2 | 10/2020 | Cho et al. | |
| 2006/0082518 A1 * | 4/2006 | Ram ..................... | G06F 1/1675 |
| | | | 345/1.1 |
| 2008/0078283 A1 * | 4/2008 | Kato ..................... | H04H 60/04 |
| | | | 84/625 |

* cited by examiner

*Primary Examiner* — Allen L Parker
*Assistant Examiner* — Dakota M Talbert
(74) *Attorney, Agent, or Firm* — Quarles & Brady LLP

(57)          ABSTRACT

In some examples, the disclosure describes a device that includes a rollable display device that is extendable in a first direction, a hinge coupled to the rollable display device to move in a second direction in response to the rollable display device being extended in the first direction, and an input device coupled to the rollable display device through the hinge.

18 Claims, 5 Drawing Sheets

ROLLABLE DISPLAY DEVICES WITH MOVABLE HINGE

BACKGROUND

An electronic device can include display devices that can display images generated by a computing device. In some examples, electronic devices can be portable electronic devices that include a display device coupled to input devices such as a keyboard or other device to provide instructions to a computing device. In some examples, the display device can be coupled to an input device utilizing a hinge device.

DETAILED DESCRIPTION

Figure 1:
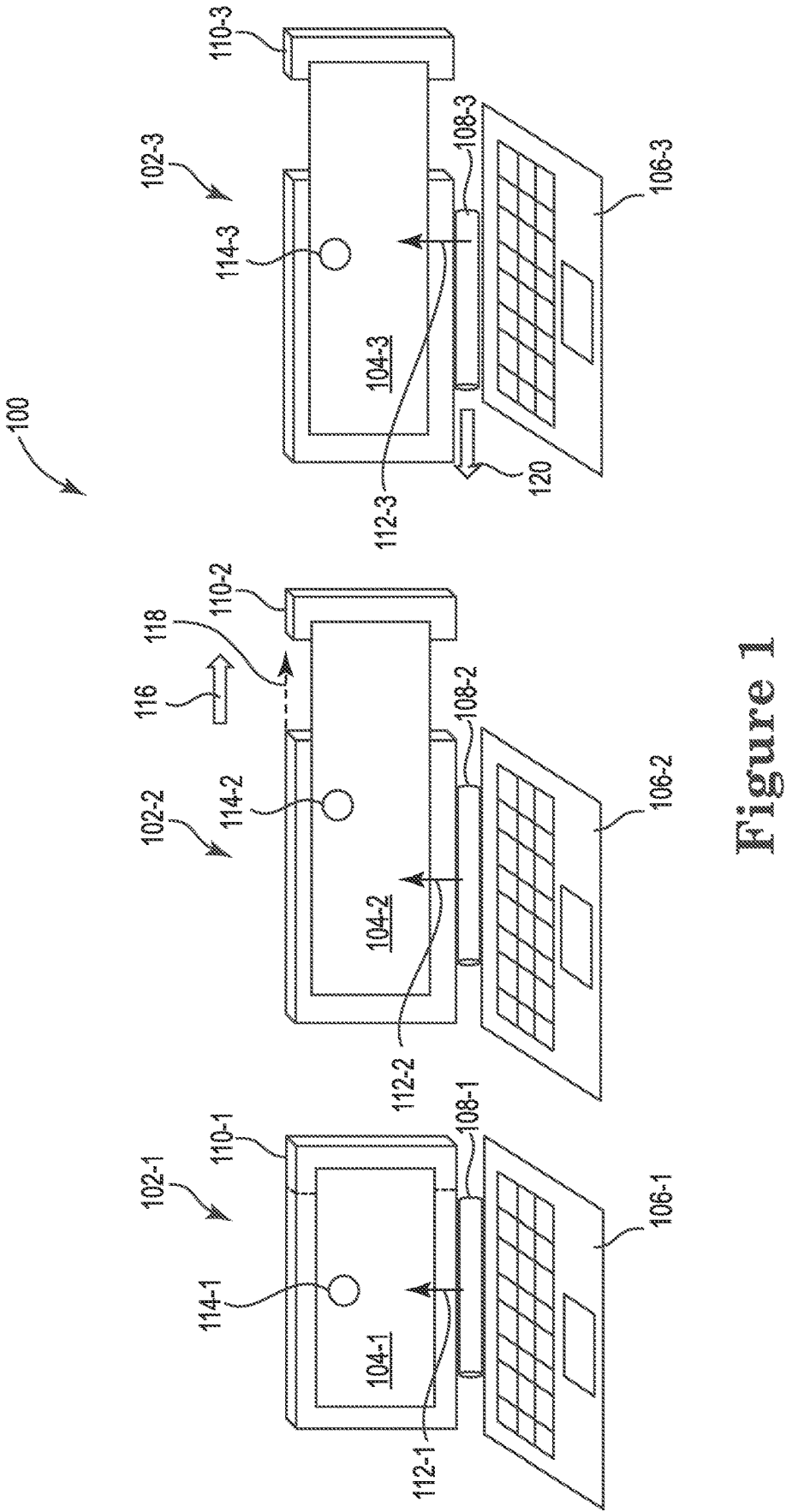
FIG. 1 illustrates an example of an electronic device that includes a rollable display device to perform an operation.

A user may utilize a computing device for various purposes, such as for business and/or recreational use. As used herein, the term computing device refers to an electronic device having a processor resource and a memory resource. Examples of computing devices can include, for instance, a laptop computer, a notebook computer, a desktop computer, and/or a mobile device (e.g., a smart phone, tablet, personal digital assistant, smart glasses, a wrist-worn device, etc.), among other types of computing devices.

Electronic devices such as computing devices can include display devices to display images generated by the computing devices. For example, the display devices can include a monitor or screen that include a plurality of light sources (e.g., light emitting diodes (LEDs), organic light emitting diodes (OLEDs), etc.) that can be utilized to generate images that are viewable by a user of the computing device. In some examples, the display devices can be utilized to display a user interface to allow a user to interact with the computing device. In some examples, the computing device can be a laptop device such as a clamshell laptop device. In these examples, the display device can be coupled to an input device by a hinge device. In some examples, the input device can include a keyboard, touchscreen, or other type of input device to allow a user to provide inputs to the computing device. In some examples, the hinge device can allow the display device to be folded toward the input device or away from the input device.

In some examples, the display devices can be rollable display devices. As used herein, a rollable display device can refer to a display device that is capable of being rolled or folded such that a first side of the display device can be positioned on a second side of the display device. In this way, the rollable display devices can be rolled or wrapped around an axis to reduce an occupied area of the rollable display device. In some examples, the rollable display devices can be coupled to a wrapping mechanism to allow the rollable display devices to be rolled into a cylindrical shape by the wrapping mechanism and allow the rollable display devices to be expanded away from the wrapping mechanism. In this way, the rollable display devices can include a displayable side and a non-displayable side, where the non-displayable side can interact with the displayable side when "rolled" by the wrapping mechanism. In some examples, the wrapping mechanism can include a spring mechanism to apply a force on the rollable display devices to allow the rollable display devices to be retracted into the wrapping mechanism through the force applied by the spring mechanism.

In some examples, the rollable display devices can be expanded in a single direction. For example, the wrapping mechanism can be positioned on a left edge of an enclosure and the rollable display device can be extended in a right direction away from the wrapping mechanism and retracted in the left direction toward the wrapping mechanism. Thus, in some examples, the rollable display device can be retractable and expandable on a single side of the rollable display device. Although examples of the wrapping mechanism positioned on a left edge of an enclosure are illustrated, other examples are also possible without departing from the present disclosure. For example, the wrapping mechanism can be positioned on the right edge of the enclosure to allow the rollable display device to be extended in a left direction and retracted in a right direction.

In these examples where the rollable display devices expand in a single direction, a center position of an input device that is coupled to the rollable display device can be misaligned with a center position of the rollable display device when a size of the rollable display device is altered. For example, a center position of a rollable display device can be aligned with a center position of an input device coupled to the rollable display device when the rollable display device is at a first position. However, in this example, altering a size of the rollable display device in a single direction (e.g., right direction, left direction, etc.) can alter a center position of the rollable display device in the single direction, which can misalign the center position of the input device with the altered center position of the rollable display device.

As used herein, a center position of a device (e.g., rollable display device, input device, etc.) can refer to a position substantially centered between two edges of the device. For example, a center position of a keyboard can be a position that is equally distant from each edge of the keyboard. As used herein, substantially centered refers to being closer to an exact center of the device than to an edge of the device or an off-center position. In some examples, the misaligned center position of the input device and rollable display device can make it more difficult to utilize the altered size of the rollable display device when utilizing the input device coupled to the rollable display device.

The present disclosure relates to rollable display devices that can be altered along a hinge to align a center position of an input device when a size or aspect ratio of the rollable display devices is altered. In this way, the rollable display device can be altered to increase or decrease the size of the displayed area and allow the rollable display device to be altered to align a center position of a current size of the rollable display device with a center position of the input device. In this way, a clamshell computing device (e.g., laptop, foldable computing device, foldable smartphone device, etc.) can be utilized with a rollable display device that is centered with an input device when the rollable display device is altered to a plurality of different sizes (e.g., screen sizes, displayed screen sizes, aspect ratios, etc.).

FIG. 1 illustrates an example of an electronic device 102-1, 102-2, 102-3 (collectively referred to as an electronic device 102) that includes a rollable display device 104-1, 104-2, 104-3 (collectively referred to as a rollable display device 104) to perform an operation 100. In some examples, the operation 100 can illustrate an electronic device 102-1 at a first position, the electronic device 102-2 at a second position, and the electronic device 102-3 at a third position. In some examples, the electronic device 102 can include a rollable display device 104 coupled to an input device 106-1, 106-2, 106-3 (collectively referred to as an input device 106) by a hinge 108-1, 108-2, 108-3 (collectively referred to as a hinge 108).

In some examples, the electronic device can include a rollable display device 104 that is extendable in a first direction (e.g., right direction as illustrated in FIG. 1, etc.), a hinge 108 coupled to the rollable display device 104 to move in a second direction (e.g., left direction as illustrated in FIG. 1, etc.) in response to the rollable display device 104 being extended in the first direction, and an input device 106 coupled to the rollable display device 104 through the hinge 108. As described further herein, the operation 100 can allow a center position 114 of the rollable display device 104 to be aligned with a center position 112 of the input device 106 when the rollable display device 104 increases or decreases in size.

In some examples, the input device 106 can include a keyboard, touchscreen, or other type of device that can provide inputs to the electronic device 102 and/or controller (e.g., computing device, etc.) associated with the electronic device 102. For example, the input device 106 can be a keyboard that is coupled to a rollable display device 104 utilizing the hinge 108. In this example, the input device 106 can include a controller that can be embedded within an enclosure of the input device 106. In these examples, the input device 106 can be utilized to communicate with the controller, which can alter or affect what is displayed by the rollable display device 104.

In some examples, the operation 100 can include the electronic device 102-1. As described herein, the electronic device 102-1 can include a first position of the rollable display device 104-1 and a first position of a hinge 108-2 coupled to an input device 106-1. In some examples, the electronic device 102-1 can illustrate a state or position when a center position 114-1 of the rollable display device 104-1 is aligned with a center position 112-1 of the input device 106-1. In some examples, the electronic device 102-1 can illustrate when the rollable display device 104-1 is in a fully retracted position or retracted to a compact state. As used herein, a compact state of the rollable display device 104-1 can be a position where the rollable display device 104-1 is not capable of retracting further by a wrapping mechanism. In this way, the rollable display device 104-1 can be in a position that is stopped or prevented from retracting further within the wrapping mechanism.

In some examples, the electronic device 102-1 can include an enclosure 110-1 that encloses or surrounds a portion of the rollable display device 104-1. In some examples, the enclosure 110-1 can be utilized to protect electronics from exterior elements. For example, the rollable display device 104-1 can include circuitry positioned on a non-display side of the rollable display device 104-1. In this way, the enclosure 110-1 can include an aperture to expose the display side of the rollable display device 104-1 while enclosing a non-display side of the rollable display device 104-1. As used herein, a display side can refer to a side that can display images and a non-display side can refer to a side that may not be capable of displaying images or is a side that is opposite to the display side.

In some examples, the enclosure 110-1 can also enclose or protect a wrapping mechanism and a portion of the rollable display device 104-1 that is folded or rolled by the wrapping mechanism. In this way, a portion of the display side of the rollable display device 104-1 may be enclosed or covered by the enclosure 110-1 when the portion of the display side is folded or rolled by the wrapping mechanism. In this way, a portion of the display side of the rollable display device 104-1 can be exposed through an aperture of the enclosure 110-1.

In some examples, the operation 100 can include an electronic device 102-2. The electronic device 102-2 can be the same or similar device as electronic device 102-1 in a second state or position. For example, the electronic device 102-2 can illustrate when the rollable display device 104-2 is extended away from the wrapping mechanism in the direction of arrow 116. As described herein, the wrapping mechanism can fold or roll the rollable display device 104-2 to a position within the enclosure 110-2. In some examples, the electronic device 102-2 can illustrate when a portion of the rollable display device 104-2 is extended from an interior portion of the enclosure 110-2 to an area that is visible through the aperture of the enclosure 110-2.

In some examples, the enclosure 110-2 can include a telescoping portion 118 that can extend and detract with the rollable display device 104-2. For example, the rollable display device 104-2 can extend from a first sized portion of the rollable display device 104-2 exposed through the enclosure 110-2 to a plurality of larger sizes. In a specific example, the rollable display device 104-2 can extend from a 16.0 inch exposed portion of the rollable display device 104-1 to one of a 17.3 inch exposed portion, 19.7 inch exposed portion, 21.5 inch exposed portion, among other sizes of exposed portions of the rollable display device 104-2. In these examples, the telescoping portion 118 of the enclosure 110 can extend to the relatively larger exposed portion sizes of the rollable display device 104-2 or retract to the relatively smaller exposed portion sizes of the rollable display device 104-1.

In these example, the telescoping portion 118 can enclose or protect the edges of the rollable display device 104 as the exposed portion of the of the rollable display device 104 is extended or retracted from the wrapping mechanism. In some examples, the telescoping portion 118 and/or the wrapping mechanism can include a sensor to identify a size of the exposed portion of the rollable display device 104. In this way, a relative size or aspect ratio of a display side of the rollable display device 104 can be determined. In some examples, the aspect ratio or area of the display side of the rollable display device that is currently exposed through the enclosure 110 can be utilized to identify a center position 114 of the rollable display device 104 at the different sizes. For example, the center position 114-1 can correspond to the aspect ratio of the display side of the rollable display device 104-1 that is exposed through an aperture of the enclosure 110-1 and the center position 114-2 can correspond to the aspect ratio of the display side of the rollable display device 104-2 that is exposed through an aperture of the enclosure 110-2.

As illustrated by the electronic device 102-2, the center position 114-2 of the rollable display device 104-2 may not align with the center position 112-2 of the input device 106-2 when the rollable display device 104-2 is extended from the wrapping mechanism in the direction of arrow 116. In this example, the center position 114-2 of the rollable display device 104-2 can be shifted to the right of the center position 112-2 of the input device 106-2, which can make it difficult to utilize the input device 106-2 with the rollable display device 104-2. Although illustrated that the center position 114-2 of the rollable display device 104-2 can be shifted to the right, it can also be possible that the center position 114-2 of the rollable display device 104-2 can be shifted to the left when the wrapping mechanism is positioned on a right side of the electronic device 102. That is, the center position 114 of the rollable display device 104 may not be aligned with the center position 112 of the input device 106 when a rollable display is extended in a single direction (e.g., right direction, left direction, etc.).

In some examples, the electronic device 102-3 can illustrate a response to a determination that the center position 114-2 of rollable display device 104-2 is not aligned with the center position 112-2 of the input device 106-2. In some examples, the electronic device 102-3 can illustrate that the hinge 108-3 can be moved in the direction of arrow 120 to align the center position 112-3 of the input device 106-3 with the center position 114-3 of the rollable display device 104-2. In some examples, a motor can be utilized to move the hinge 108-3 through an aperture of the input device 106-3 in the direction of arrow 120 to a particular location such that the center position 112-3 of the input device 106-3 is aligned with the center position 114-3 of the rollable display device 104-2. For example, the hinge 108-3 can move in the direction of arrow 120 and move the rollable display device 104-3 and/or enclosure 110-3 in the direction of arrow 120 without moving the input device 106-3. Thus, the center position 114-3 can moved in the direction of arrow 120 to align with the center position 112-3 of the input device 106-3. In this way, the electronic device 102-3 can be utilized with the larger aspect ratio of the rollable display device 104-3 with the input device 106-3 aligned with a center position 114-3 of the rollable display device 104-3. This can allow a user to more easily utilize each edge of the rollable display device 104-3 compared to having a relatively larger portion of the rollable display device 104-3 positioned to the right or left of the input device 106-3.

Figure 2:
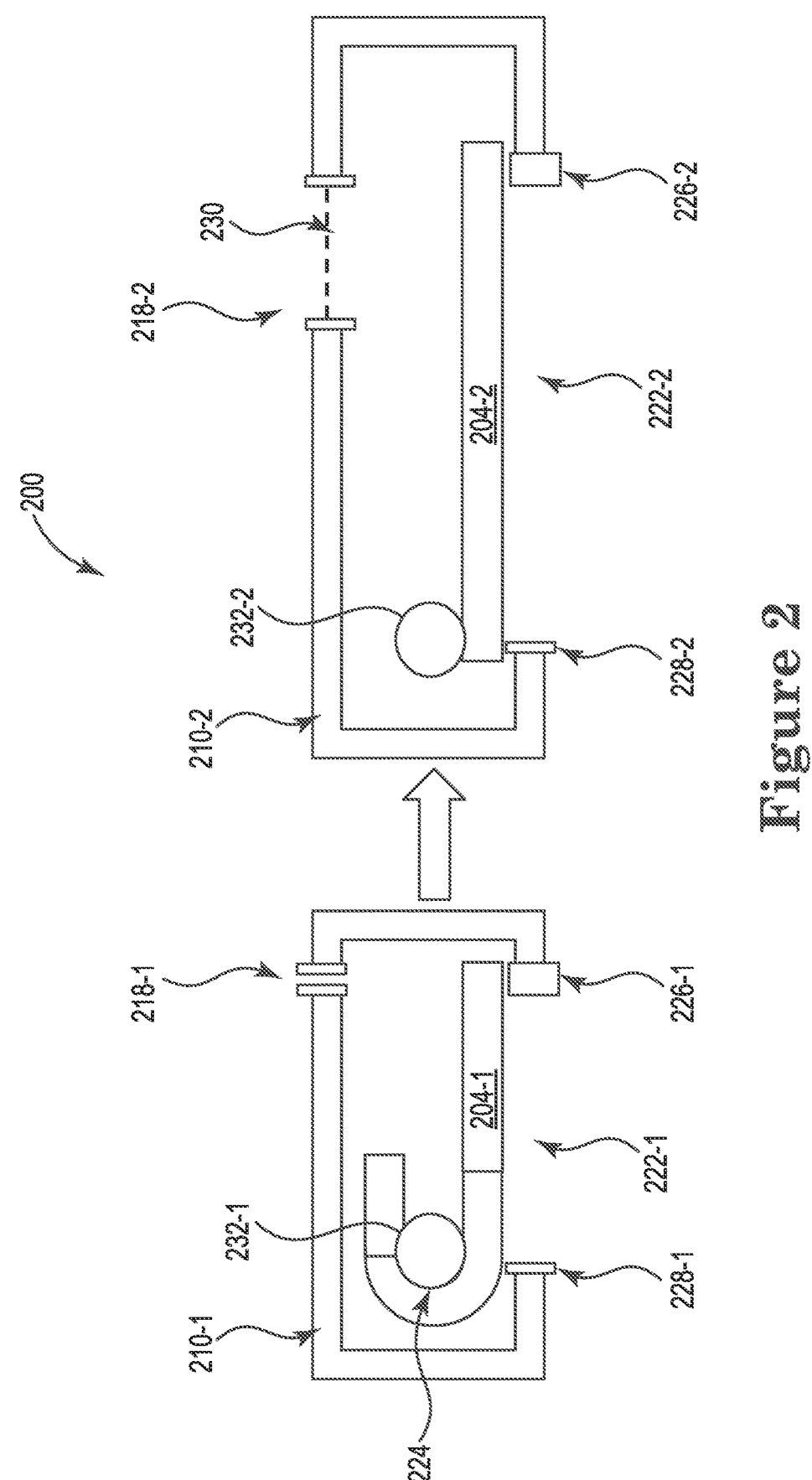
FIG. 2 illustrates an example of an enclosure that includes a rollable display device to perform an operation.

FIG. 2 illustrates an example of an enclosure 210-1, 210-2 (referred to collectively as an enclosure 210) that includes a rollable display device 204-1, 204-2 (referred to collectively as rollable display device 204) to perform an operation 200. In some examples, the enclosure 210 can include the same or similar elements as enclosure 110 as referenced in FIG. 1. For example, the enclosure 210 can include a rollable display device 204 that can be extended or retracted within the enclosure 210.

In some examples, the enclosure 210-1 can illustrate when the rollable display device 204-1 includes a portion 224 that is wrapped or rolled within an interior portion of the enclosure 210-1 by a wrapping mechanism 232-1. As described herein, a wrapping mechanism 232-1 can include a device that is capable of folding or rolling the rollable display device 204-1 within a particular space. In some examples, the wrapping mechanism 232-1 can include a space to fold or roll the rollable display device 204-1 within an interior area of the enclosure 210-1. For example, the portion 224 can be positioned within the interior area of the enclosure 210-1. In this way, the portion 224 may not be viewable through an aperture 222-1 when the wrapping mechanism 232-1 positions the portion 224 within the interior area of the enclosure 210-1. In this way, a portion of the rollable display device 204-1 can be viewed through the aperture 222-1 positioned between a first edge 226-1 and a second edge 228-1. In some examples, the first edge 226-1 can move with an edge of the rollable display device 204-1 and the second edge 228-1 can remain stationary while the wrapping mechanism 232-1 moves the rollable display device 204-1 through a slot or aperture of the second edge 228-1. In this way, the rollable display device 204-1 can be expanded in a single direction (e.g., to the right of FIG. 2, etc.) and/or retracted in an opposite direction (e.g., to the left of FIG. 2, etc.).

In some examples, the wrapping mechanism 232-1 can include a cylindrical portion that can be utilized to wrap the portion 224 around a surface of the cylindrical portion. For example, the portion 224 can interact with a surface of the cylindrical portion of the wrapping mechanism 232-1 and wrap around the surface of the cylindrical portion when the cylindrical portion is rotated. In this way, the wrapping mechanism 232-1 can utilize a tension device (e.g., spring, gear box, motor, etc.) to force the portion 224 into a portion within the interior of the enclosure 210-1 by rotating a cylindrical portion to wrap or fold the portion 224 of the rollable display device 204-1. In some examples, the wrapping mechanism 232-1 can consistently expand and contract a size or area that is positioned within the aperture 222-1.

In some examples, the aperture 222-1 can be expanded to a larger size as illustrated by aperture 222-2. In some examples, the enclosure 210-1 can include a telescoping portion 218-1 that can be expanded or contracted with the rollable display device 204 to enclose a border or edge of the rollable display device 204. For example, the when the rollable display device 204-1 is extracted from the wrapping mechanism 232-1 to provide the portion 224 to be positioned within the aperture 222-1, the telescoping portion 218-1 can expand with the rollable display device 204-1.

The enclosure 210-2 illustrates when the portion 224 of the rollable display device 204-2 is extended or extracted from the wrapping mechanism 232-2. In some examples, the wrapping mechanism 232-2 can allow the rollable display device 204-2 to be moved through a slot or aperture within the enclosure 210-2 on a second edge 228-2 of the aperture 222-2. As described herein, the second edge 228-2 can include a slot or aperture to allow the rollable display device 204-2 to pass through the second edge 228-2 to allow the second edge 228-2 to remain stationary when the rollable display device 204-2 moves from a first position (e.g., illustrated by rollable display device 204-1) to a second position (e.g., illustrated by rollable display device 204-2).

In some examples, the first edge 226-2 can be coupled to an edge or side of the rollable display device 204-2 such that the first edge 226-2 can move with the rollable display device 204-2. In some examples, the first edge 226-2 can be moveable with the rollable display device 204-2 to expand a size of the rollable display device 204-2 positioned within the aperture 222-2 and/or reduce the size of the rollable display device 204-2 positioned within the aperture 222-2. In this way, the first edge 226-2 can define an edge of the boundary of the aperture 222-2.

In some examples, the enclosure 210-2 can include a telescoping portion 218-2. In some examples, the telescoping portion 218-2 can be moveable in the same direction as the rollable display device 204-2. In this way, the telescoping portion 218-2 can be expanded to allow the size of the aperture 222-2 and/or size of the rollable display device 204-2 viewable through the aperture 222-2 to be increased. In this way, the aspect ratio of a viewable portion of the rollable display device 204-2 can be increased. In some examples, the telescoping portion 218-2 can increase a width of the enclosure 210-2 by a distance 230. In some examples, the distance 230 can equal a distance of the portion 224 of the rollable display device 204-1 that is positioned within the enclosure 210-1. In this way, the portion 224 can be expanded within the increased distance 230 of the aperture 222-2.

In some examples, the telescoping portion 218-2 can include a plurality of enclosure portions that can slide to allow the enclosure 210-2 to expand the distance 230 while still covering the extended edge of the rollable display device 204-2. In this way, the telescoping portion 218-2 can protect an edge of the rollable display device 204-2 when expanded the distance 230.

Figure 3:
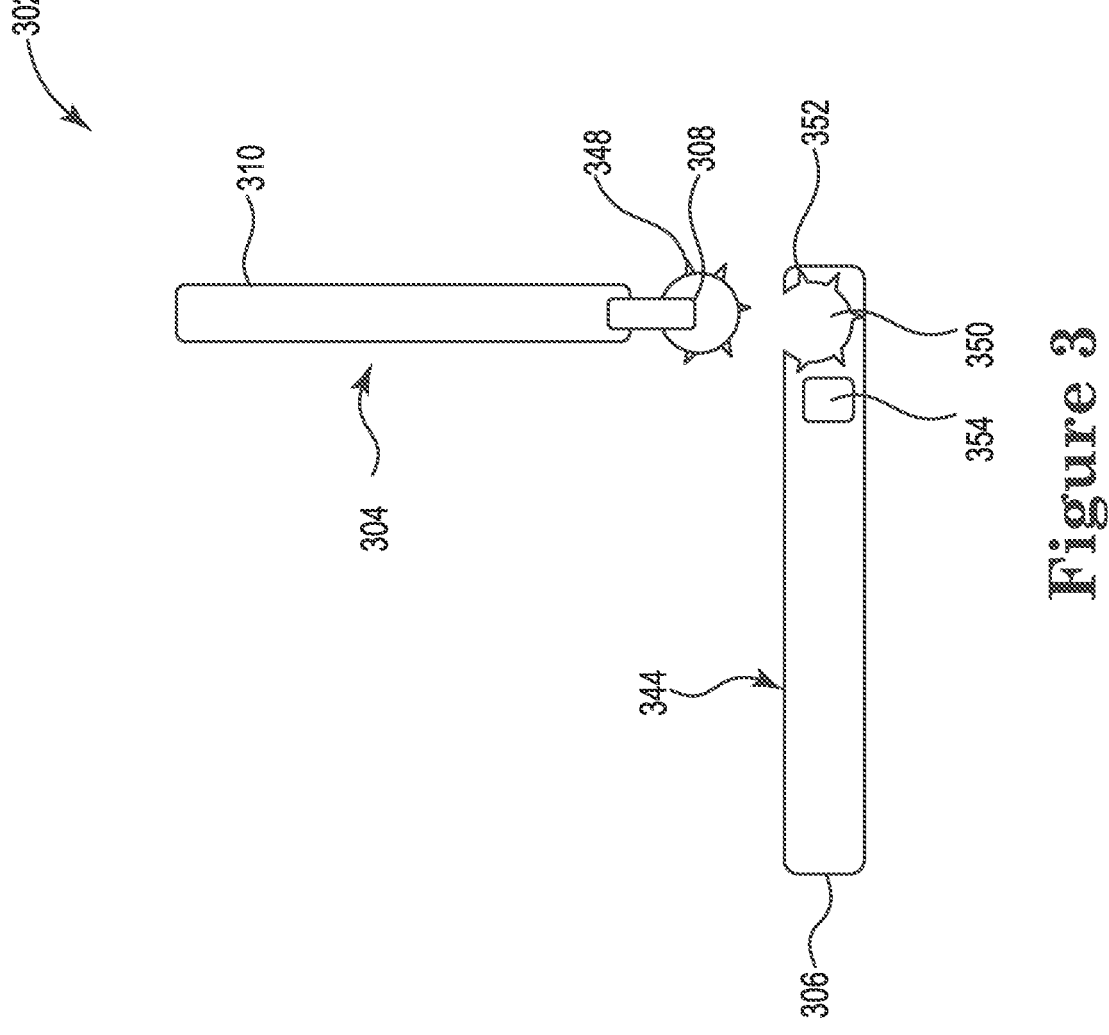
FIG. 3 illustrates an example of an electronic device that includes a rollable display device to perform an operation.

FIG. 3 illustrates an example of an electronic device 302 that includes a rollable display device 304 to perform an operation. FIG. 3 illustrates the electronic device 302 from a side view. The electronic device 302 can include the same or similar elements as the electronic device 102 as illustrated in FIG. 1 and/or the enclosure 210 as illustrated in FIG. 2. For example, the electronic device 302 can include an enclosure 310 that includes a rollable display device 304 that can be extended in a particular direction to increase a size of the rollable display device 304.

In some examples, the enclosure 310 can be coupled to an input device 306 by a hinge 308 that is positioned within an aperture 350 of the input device 306. In some examples, the hinge 308 can allow the enclosure 310 to be positioned on the input device 306 such that a surface of the rollable display device 304 is proximate to an input side 344 of the input device 306. As used herein, an input side 344 of an input device 306 can include a side or portion of the input device 306 that can receive inputs from a user. For example, the input side 344 of the input device 306 can include a keyboard, touchscreen, track pad, or other surfaces that can be utilized to provide an input to a computing device or rollable display device 304.

In some examples, the hinge 308 can include protrusions 348 that can extend from a surface of the hinge 308. In some examples, the protrusions 348 can be positioned within corresponding apertures 352. In this way, the protrusions 348 can interact with the surface of the aperture 350 and still be allowed to move in a direction along the aperture 350. For example, the hinge 308 can move in a direction that is into the page as illustrated in FIG. 3 and/or out of the page as illustrated in FIG. 3. In these examples, the aperture 350 can extend along an edge of the input device 306, which can allow the hinge 308 to move along the edge of the input device. For example, the hinge 308 can be moved in a direction that is parallel to the edge of the input device 306 to align a center position of the input device 306 with a center position of the rollable display device 304 when the rollable display device 304 is extended or retracted to different sizes from a particular direction.

In some examples, the input device 306 can include a magnetic device 354. In some examples, the magnetic device 354 can be utilized to determine a location of the hinge 308 within the aperture 350 of the input device 306. For example, a motor can move the hinge 308 from a first position to a second position. In this example, the magnetic device 354 can be move for a corresponding first position to a corresponding second position. In some examples, the position of the magnetic device can correspond to a particular position of the hinge 308. In these examples, the position of the magnetic device 354 and/or the position of the hinge 308 can indicate whether the center position of the rollable display device 304 is aligned with a center position of the input device 306.

In some examples, a sensor can be utilized to determine a size of the rollable display device 304 based on a quantity of the rollable display device that is extended from a wrapping mechanism. When the size of the rollable display device 304 is determined, a corresponding location of the hinge 308 can be determined to align the center position of the rollable display device 304 with a center position of the input device 306. In these examples, the magnetic device 354 can be utilized to determine a current position of the hinge 308 to identify when the hinge 308 has to be moved to a different position to align the center position of the rollable display device 304 with a center position of the input device 306.

Figure 4:
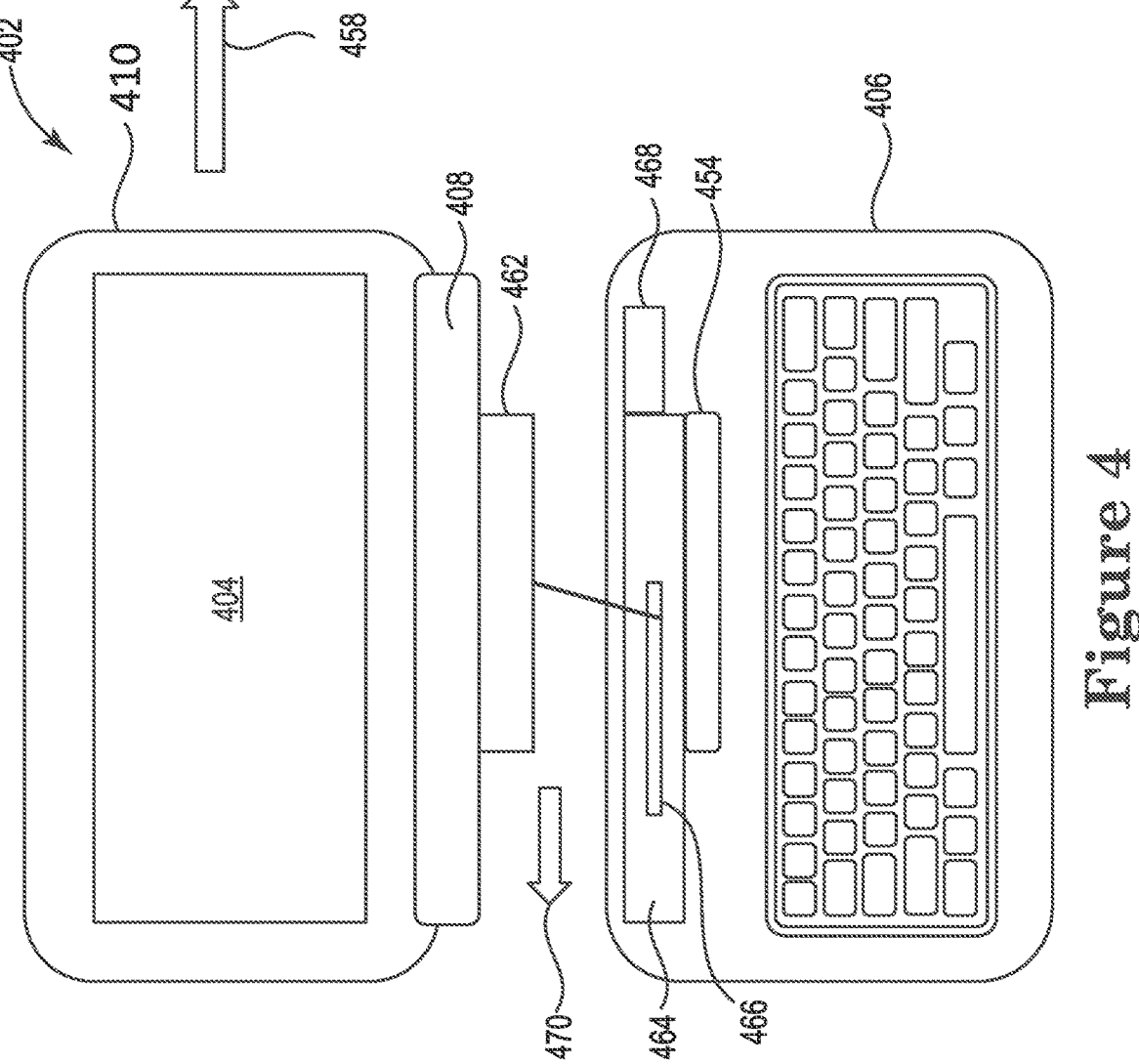
FIG. 4 illustrates an example of an electronic device that includes a rollable display device to perform an operation.

FIG. 4 illustrates an example of an electronic device 402 that includes a rollable display device 404 to perform an operation. In some examples, the operation can include the rollable display device 404 being extended in the direction of arrow 458. In some examples, the extension of the rollable display device 404 can increase a size of the rollable display device 404 in the direction of arrow 458, which can misalign a center position of the rollable display device 404 with a center position of an input device 406. In some examples, the operation can include moving the hinge 408 coupled to an enclosure 410 of the rollable display device 404 in the direction of arrow 470 to align the center position of the increased size rollable display device 404 with a center position of the input device 406. In these examples, a location of the input device 406 can remain the same while the location of the hinge 408 and rollable display device 404 are moved in the direction of the arrow 470.

As described herein, the electronic device 402 can include a rollable display device 404 that is retractable and expandable to alter a width of the rollable display device 404 between a first distance and a second distance. In some examples, the rollable display device 404 can be expanded in the first direction and retracted in the second direction. In some examples, the rollable display device 404 can increase a width of a display area when the rollable display device 404 is extended in the first direction (e.g., direction of arrow 458). That is, the display area of the electronic device 402 can be extended in a single direction to increase the width of the rollable display device 404. As used herein, the display area can refer to an area that is positioned through an aperture of an enclosure 410 and/or an area of the rollable display device 404 that is viewable by a user of the electronic device 402.

In some examples, the electronic device 402 can include a communication cable 462. As used herein, a communication cable can refer to a physical connection (e.g., wire, cable, etc.) that can allow communication to occur between devices. For example, the communication cable 462 can be a flat cable or other type of cable that can allow a computing device within the input device 406 to communicate with the rollable display device 404. In some examples, the input device 406 can be a base of a clamshell laptop device. In these examples, the input device 406 an include an enclosure to surround a computing device that can be coupled to the rollable display device 404 through the communication cable 462. In some examples, the communication cable 462 can provide a permanent or substantially permanent connection between the computing device and the rollable display device 404.

In some examples, the input device 406 can include a slotted fixture 464 that can be utilized to receive the communication cable 462. In some examples, the hinge 408 can include a slotted fixture 464 to allow the communication cable 462 to pass through the aperture 466 (e.g., slot) to an input device 406 (e.g., input device base, base, etc.). In these examples, the slotted fixture can be movable parallel to the width of the rollable display device 404 in a first direction and a second direction. In some examples, the slotted fixture 464 can allow the communication cable 462 to remain at a fixed location when the slotted fixture 464 moves in the first direction and the second direction. For example, the slotted fixture 464 can move with the hinge 408 and include the aperture 466 to prevent the slotted fixture 464 from interacting with the communication cable 462 when the communication cable 462 remains in a fixed location.

In some examples, the slotted fixture 464 can include an aperture 466 to allow the communication cable 462 to pass through an enclosure of the input device 406. In some examples, the slotted fixture 464 can include an aperture 466 that can be relatively larger than the communication cable 462. In some examples, the aperture 466 can extend in the direction of arrow 470 to allow the communication cable 462 to move with the hinge 408, enclosure 410, and rollable display device 404 in the direction of arrow 470. For example, the aperture 466 (e.g., slot, hole, etc.) can extend from a first position to allow the communication cable 462 to be positioned on a first edge of the aperture 466 when the hinge 408 is at a first location to a second position to allow the communication cable 462 to be positioned on a second edge of the aperture 466 when the hinge 408 is at a second location.

In some examples, the input device 406 can include a magnetic device 454 that can be utilized to track a position or location of the hinge 408. As described herein, the location of the hinge 408 can be utilized to alter a location of the rollable display device 404 to align a center position of the rollable display device 404 with a center position of the input device 406. For example, the rollable display device 404 can be extended in the direction of arrow 458. A sensor associated with the rollable display device 404 can indicate an increased size of the rollable display device 404. In this example, a motor 468 can move the hinge 408 in the direction of arrow 470 based on the indicated increased size of the rollable display device 404. In some examples, the motor 468 can be coupled to a magnetic device 454 (e.g., magnet, etc.) that interacts with the hinge 408 to move the hinge 408 in an opposite direction as the rollable display device 404 when the motor 468 moves the magnetic device 454 in the opposite direction.

In some examples, a distance of extension in a particular direction can be detected by a sensor (e.g., wrapping device sensor, enclosure sensor, etc.) and transmitted to a motor 468 coupled to the hinge 408 to move the hinge 408 in an opposite direction in response to the detected distance of extension. That is, the motor 468 can move the hinge 408 in an opposite direction as the rollable display device 404. In addition, the motor 468 can move the hinge 408 a particular distance in the opposite direction based on the detected distance of extension. As described herein, the distance traveled by the hinge 408 can be detected by a sensor (e.g., magnetic sensor, electrical sensor, etc.) associated with the magnetic device 454 that can move with the hinge 408. For example, a magnetic sensor can be altered based on the movement of the magnetic device 454 and the magnetic sensor can provide the information to the motor 468 and/or controller (e.g., controller 572 as illustrated in FIG. 5, etc.).

In other examples, the sensor associated with the rollable display device 404 can determine when the distance of extension has reached a threshold distance. In these examples, the threshold distance can correspond to a particular aspect ratio that is provided by a computing device or controller. In these examples, the sensor associated with the rollable display device 404 can send a signal to a controller to indicate when the distance of extension corresponds to a particular aspect ratio and the controller can alter an aspect ratio of the rollable display device 404 to the particular aspect ratio.

Figure 5:
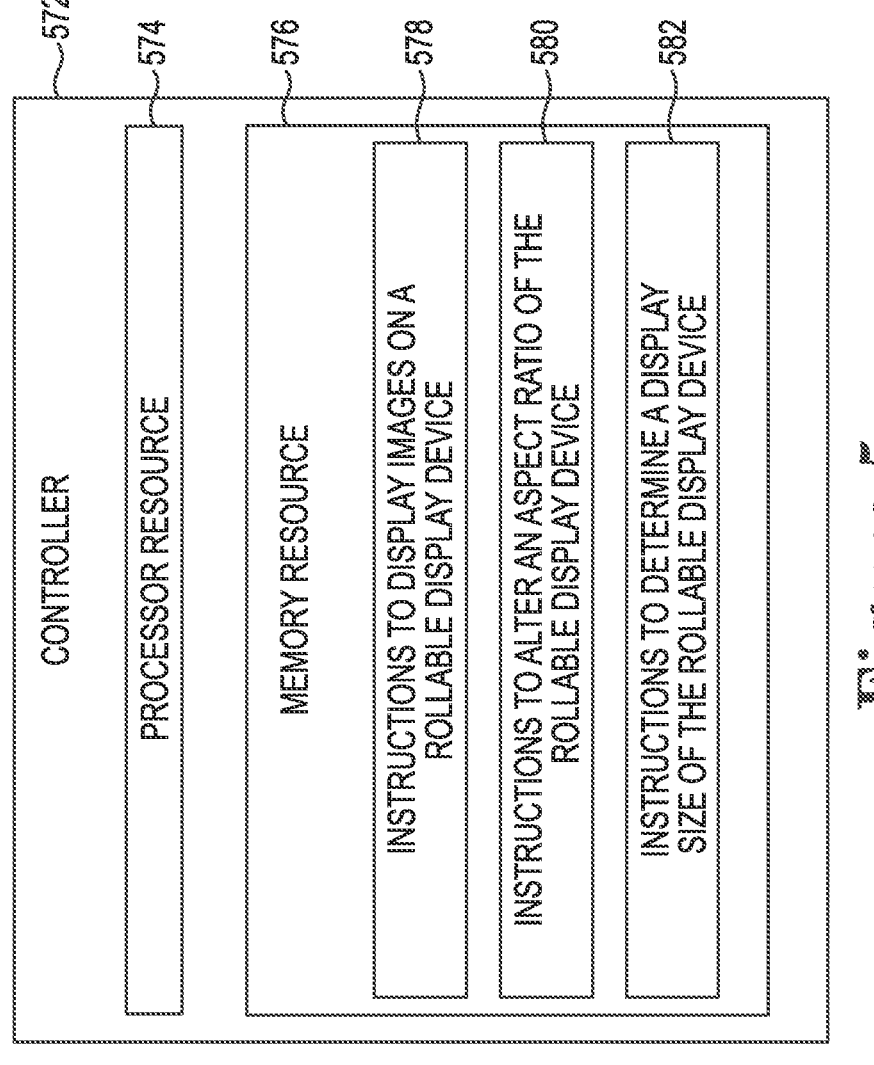
FIG. 5 illustrates an example of a controller of an electronic device that includes a rollable display device.

FIG. 5 illustrates an example of a controller 572 of an electronic device that includes a rollable display device. In some examples the controller 572 (e.g., computing device, computer, etc.) can include a processor resource 574 communicatively coupled to a memory resource 576. As described further herein, the memory resource 576 can include instructions 578, 580, 582, that can be executed by the processor resource 574 to perform particular functions. In some examples, the controller 572 can be associated with a display device (e.g., liquid crystal display, touch screen, etc.). In some examples, the controller 572 can be part of a mobile device, such as a laptop or clamshell computing device.

The controller 572 can include components such as a processor resource 574. As used herein, the processor resource 574 can include, but is not limited to: a central processing unit (CPU), an application specific integrated circuit (ASIC), a field programmable gate array (FPGA), a metal-programmable cell array (MPCA), a semiconductor-based microprocessor, or other combination of circuitry and/or logic to orchestrate execution of instructions 578, 580, 582. In other examples, the controller 572 can include instructions 578, 580, 582, stored on a machine-readable medium (e.g., memory resource 576, non-transitory computer-readable medium, etc.) and executable by a processor resource 574. In a specific example, the controller 572 utilizes a non-transitory computer-readable medium storing instructions 578, 580, 582, that, when executed, cause the processor resource 574 to perform corresponding functions.

In some examples, the controller 572 can include instructions 578 to display images on a rollable display device. For example, the controller 572 can include instructions to display images on to the rollable display device based on the current width of the rollable display device. As described herein, a rollable display device can include a display device that is capable of being folded or rolled such that a display side of the rollable display device can face or make contact with a non-display side of the rollable display device. For example, the rollable display device can be a display device that is capable of displaying images provide by a computing device and turn multiple times around an axis. In some examples, the rollable display device can be rolled or folded behind an enclosure of a computing device to prevent a portion of the rollable display device from being viewed through an aperture of the enclosure.

In some examples, the controller 572 can determine a width or size of a portion of the rollable display device that is viewable through an aperture of the enclosure and alter a display mode of the rollable display device such that images provided to the rollable display device fill the portion that is viewable through the aperture of the enclosure. In this way, the rollable display device can increase a size or width that is viewable through the aperture and the controller 572 can provide images to the rollable display device that fill the viewable portion. In some examples, the controller 572 can determine when the rollable display device reaches or extends to a particular width that corresponds to a particular aspect ratio for the viewable portion of the rollable display device. In these examples, the controller 572 can switch from a particular aspect ratio to the determined aspect ratio when the rollable display device reaches the particular width.

In some examples, the controller 572 can include instructions 580 to alter an aspect ratio of the rollable display. For example, the controller 572 can include instructions to alter an aspect ratio for images generated on the rollable display device based on the determined width of the rollable display device. As described herein, the controller 572 can determine when the width of the rollable display device corresponds to a particular aspect ratio and the controller 572 can alter the aspect ratio for images generated on the rollable display device to the particular aspect ratio.

In some examples, the controller 572 can include instructions 582 to determine a display size of the rollable display. As described herein, the display size or viewable portion of the rollable display can be changed by extending or retracting an edge of the rollable display device. In some examples, the width of the rollable display device can be increased in a first direction and decreased in an opposite second direction. For example, a wrapping mechanism can allow the rollable display device to be extracted and/or extended in a right direction and the wrapping mechanism can allow the rollable display device to be retracted or shortened in the left direction. In this way, the center position of the rollable display device can be altered when the rollable display device is extended or retracted.

In some examples, the controller 572 can utilize a sensor coupled to the wrapping mechanism to determine a quantity of the rollable display device that is extended. In some examples, the sensor can be a rotational sensor that determines the rotational position of the wrapping mechanism. In other examples, the controller 572 can utilize a sensor coupled to the enclosure of the rollable display device to determine a width and/or overall size of the enclosure to determine the size of the display that is viewable through the aperture of the enclosure. In this way, the controller 572 can alter a size or dimensions of the images that are provided to the rollable display device such that the viewable portion includes images or activated light sources and the non-viewable portion may not include images or activated light sources.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" refers to one such thing or more than one such thing.

The figures herein follow a numbering convention in which the first digit corresponds to the drawing figure number and the remaining digits identify an element or component in the drawing. For example, reference numeral 102 may refer to element 102 in FIG. 1 and an analogous element may be identified by reference numeral 302 in FIG. 3. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples, and data provide a description of the system and method of the disclosure. Since many examples can be made without departing from the spirit and scope of the system and method of the disclosure, this specification merely sets forth some of the many possible example configurations and implementations.

What is claimed is:

1. An electronic device, comprising:
   a rollable display device that is extendable in a first direction;
   a hinge coupled to the rollable display device, wherein the hinge is to move in a second direction in response to the rollable display device being extended in the first direction;
   a magnet that interacts with the hinge to move the hinge in the second direction;
   a motor coupled to the magnet to move the hinge in the second direction when the motor moves the magnet in the second direction; and
   an input device coupled to the rollable display device through the hinge.

2. The electronic device of claim 1, wherein the hinge is to move in the second direction to align a center position of the rollable display device with a center position of the input device.

3. The electronic device of claim 1, wherein the rollable display device is to increase a width of a display area when the rollable display device is extended in the first direction.

4. The electronic device of claim 1, wherein the hinge includes a slot to receive a cable that connects the rollable display device to the input device.

5. The electronic device of claim 4, wherein the slot allows the hinge to move in the second direction when the cable is stationary.

6. The electronic device of claim 1, wherein a distance of extension in the first direction is detected by a sensor and transmitted to the motor coupled to the hinge to move the hinge in the second direction in response to the detected distance of extension.

7. The electronic device of claim 1, further comprising a wrapping mechanism, wherein the rollable display device is rollable via the wrapping mechanism.

8. The electronic device of claim 7, further comprising an enclosure that encloses a portion of the rollable display device rolled by the wrapping mechanism.

9. The electronic device of claim 8, wherein the enclosure includes a telescoping portion that extends with the rollable display device.

10. The electronic device of claim 9, wherein the telescoping portion covers edges of the rollable display device when the rollable display device is extended.

11. An electronic device, comprising:
    a rollable display device that is retractable and expandable to alter a width of the rollable display device between a first distance and a second distance;
    a hinge that includes a slotted fixture to allow a communication cable to pass through the slotted fixture to an input device base, wherein the slotted fixture is movable parallel to the width of the rollable display device in a first direction and a second direction, and wherein the slotted fixture allows the communication cable to remain at a fixed location when the slotted fixture moves in the first direction and the second direction; and the input device base comprising a controller coupled to the communication cable to display images on to the rollable display device based on a current width of the rollable display device.

12. The electronic device of claim 11, wherein the hinge includes a motor to move the hinge in response to the current width of the rollable display device such that a center position of the current width of the rollable display device is aligned with a center position of the input device base.

13. The electronic device of claim 11, wherein the rollable display device is retractable and expandable on a single side of the rollable display device.

14. The electronic device of claim 11, further comprising a magnetic device to determine a location of the hinge.

15. The electronic device of claim 11, further comprising:

a wrapping mechanism, wherein the rollable display device is rollable via the wrapping mechanism; and a sensor to determine the width of the rollable display device based on a quantity of the rollable display device that is extended from the wrapping mechanism.

16. An electronic device, comprising:

a rollable display device that is retractable into an enclosure of the rollable display device to decrease a width of the rollable display device and extractable out of the enclosure of the rollable display device to increase the width of the rollable display device;

a sensor to determine the width of the rollable display device;

a hinge to couple the rollable display device to an input device base, wherein the hinge includes a slotted fixture that can move the rollable display device to align a center position of the rollable display device with a center position of the input device base in response to a change in the width of the rollable display device, wherein the hinge includes a magnetic device coupled to the slotted fixture to move the slotted fixture in response to a change in the determined width of the rollable display device;

a connection cable coupled to the rollable display device and to the input device base, wherein the connection cable is positioned through a slot of the slotted fixture; and a controller within the input device base to alter an aspect ratio for images generated on the rollable display device based on the determined width of the rollable display device.

17. The electronic device of claim 16, wherein the determined width includes a distance of display device exposed to a user when extended from a wrapping mechanism.

18. The electronic device of claim 16, wherein the controller activates a portion of the rollable display device based on the determined width of the rollable display device.

* * * * *